FRANK ELLSWORTH KNAPP, OF CHICAGO, ILLINOIS.

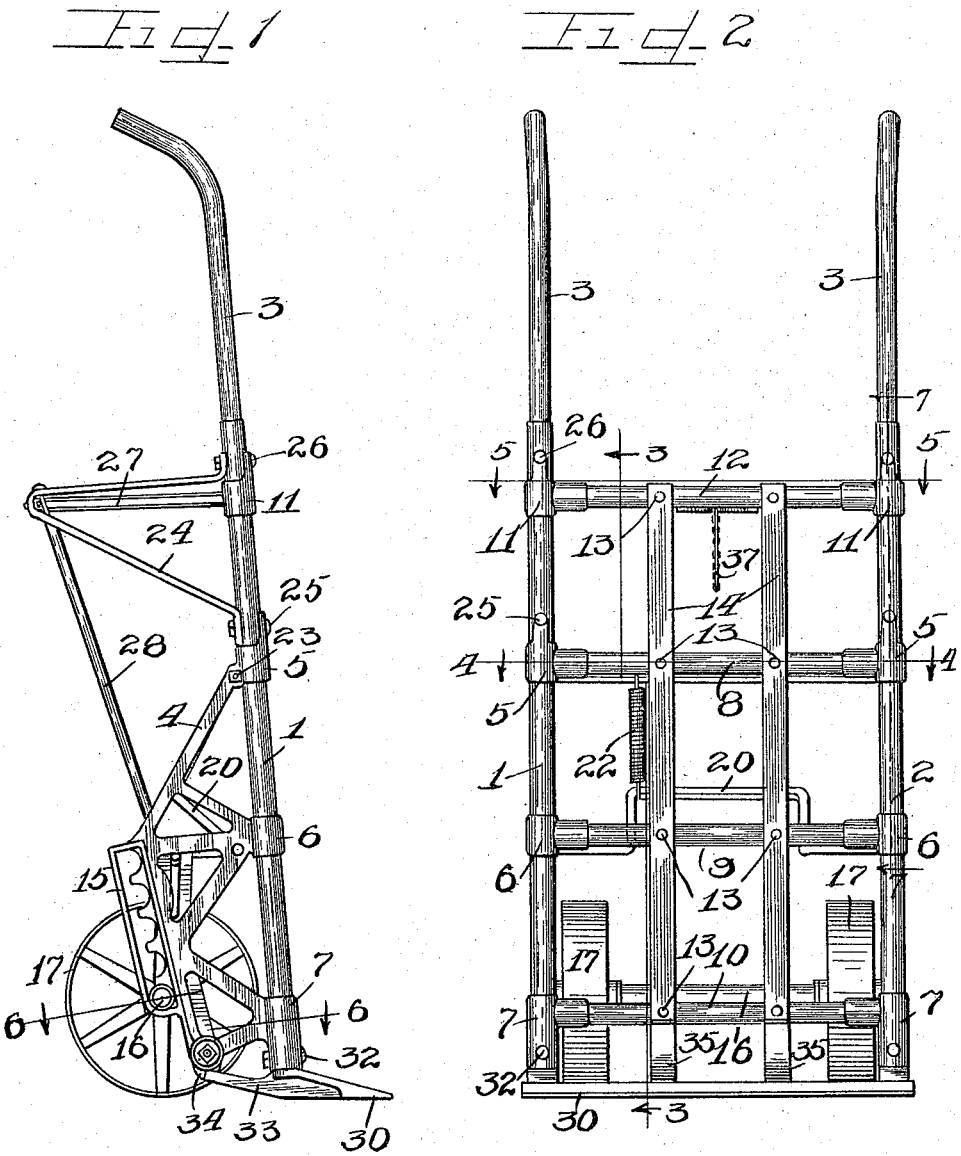

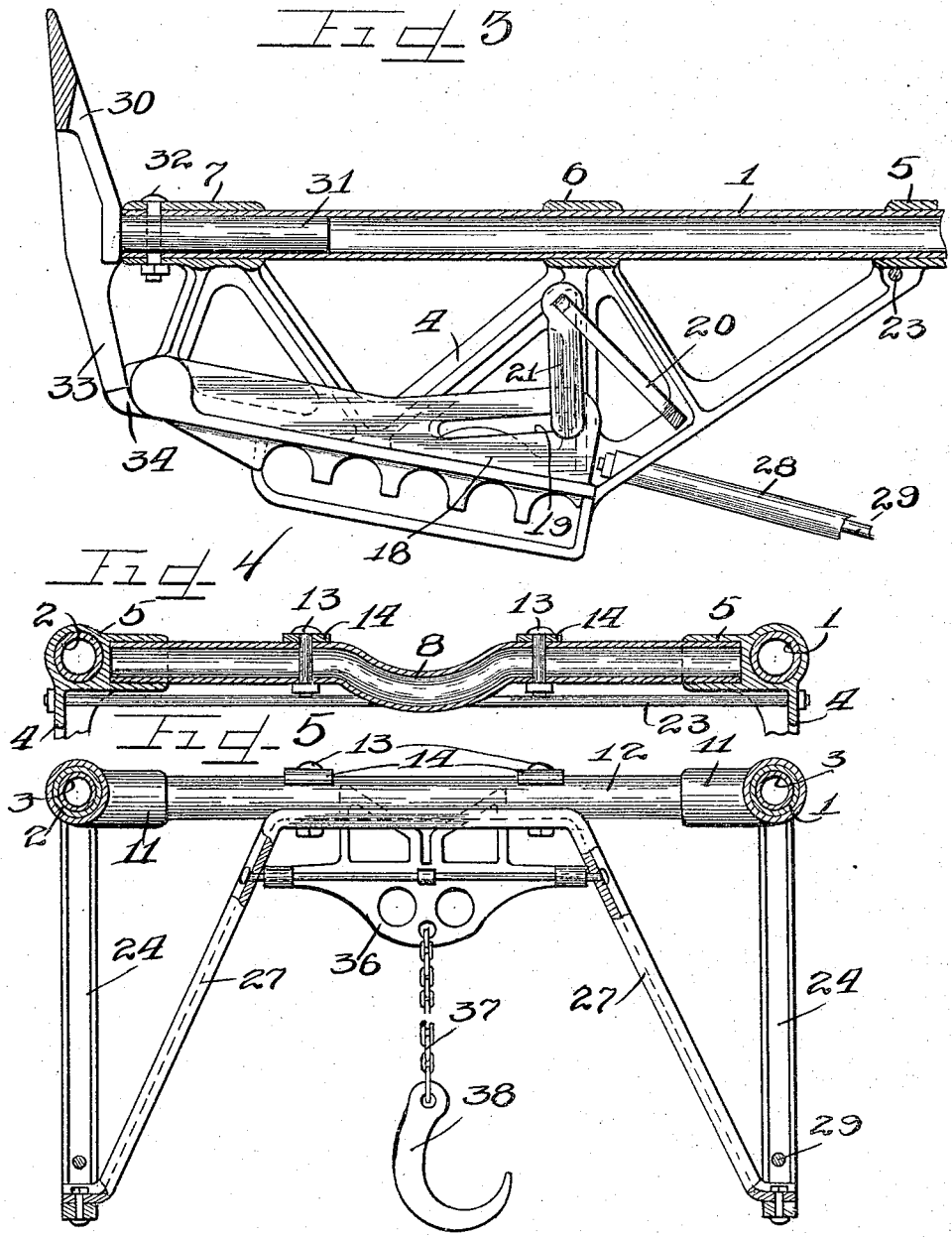

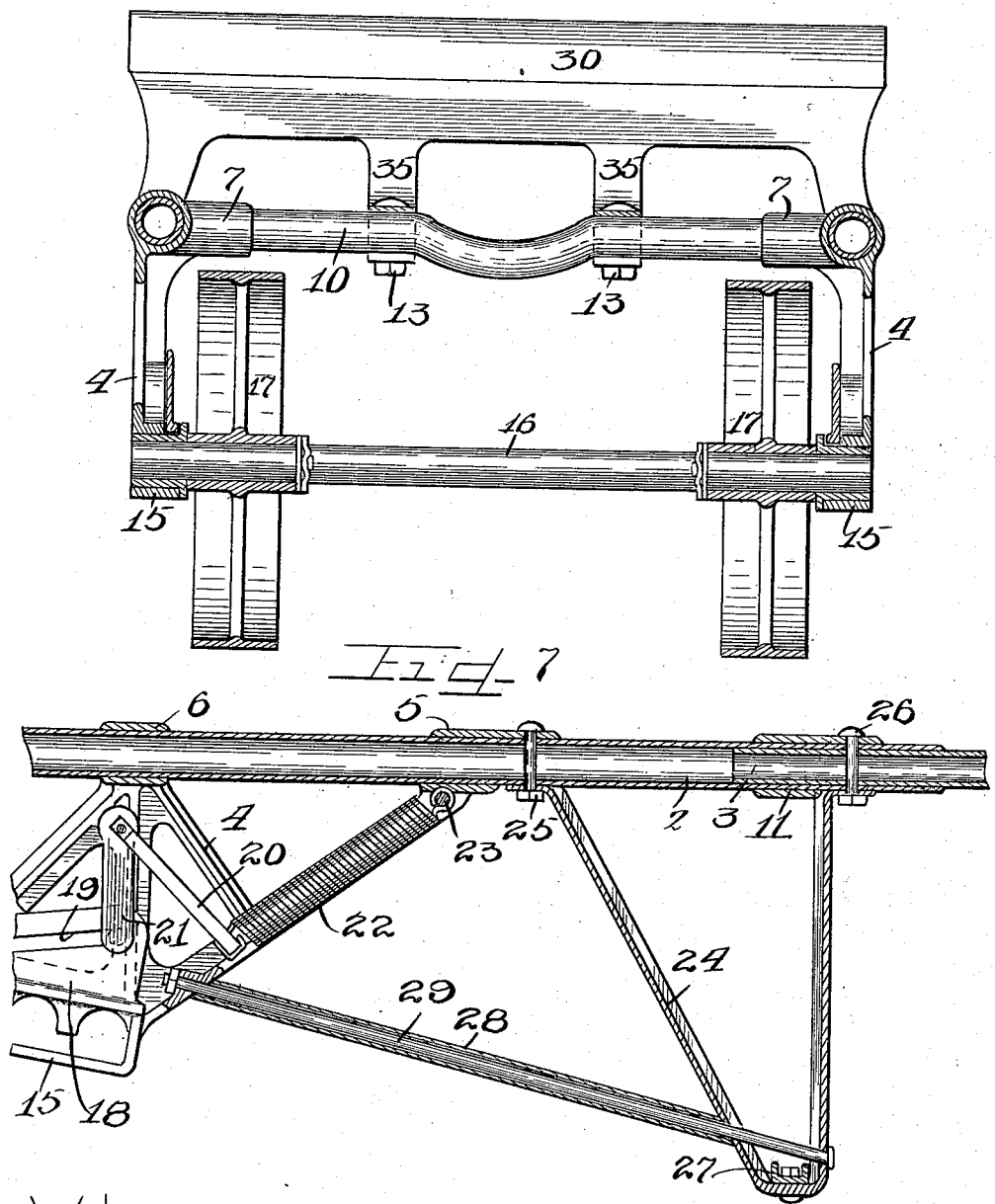

HAND-TRUCK CONSTRUCTION.

1,192,790.

Specification of Letters Patent.

Patented July 25, 1916.

Application filed September 24, 1914. Serial No. 863,266.

*To all whom it may concern:*

Be it known that I, FRANK ELLSWORTH KNAPP, a citizen of the United States, and a resident of the city of Chicago, in the county of Cook and State of Illinois, have invented certain new and useful Improvements in Hand-Truck Constructions; and I do hereby declare that the following is a full, clear, and exact description of the same, reference being had to the accompanying drawings, and to the numerals of reference marked thereon, which form a part of this specification.

This invention relates to an improved design and construction of a hand truck which greatly simplifies the assembly of the parts and also affords a truck of much greater strength than the general type heretofore constructed.

By this invention the use of rivets is practically obviated, and only at a few points are connecting means, such as bolts, employed. The side bar frame members of the device, which are subjected to the greatest stress in carrying a load, are braced longitudinally and are prevented from spreading from one another at a number of points, so that an exceedingly rigid device is secured.

It is an object of this invention to construct a hand truck built up of tubular sections, the longitudinal side frame members being connected at a number of points intermediate their ends by cross pieces or transverse members engaged in T's secured on said side frame members.

It is also an object of this invention to construct a truck of improved design, the tubular side frame members of which are braced longitudinally for practically their entire length, said bracing means affording a convenient point of attachment for the wheels and part of said bracing means also acting as legs for the truck when resting entirely upon the ground.

It is furthermore an important object of this invention to construct a heavy duty truck provided with a truss structure beneath the side sills of the truck and upon which the wheels are mounted, said truss structure also acting to brace the toe of the truck.

It is finally an object of this invention to afford a hand truck simple in construction and assembly and designed for great strength and of relatively light weight.

The invention (in a preferred form) is illustrated in the drawings and hereinafter more fully described.

In the drawings: Figure 1 is a side elevation of a truck embodying the principles of my invention shown in upright position. Fig. 2 is a front view thereof. Fig. 3 is a fragmentary detail of the front end of the truck, with the sill 1 shown in section and with parts omitted, taken on line 3—3 of Fig. 2. Fig. 4 is a detail section taken on line 4—4 of Fig. 2. Fig. 5 is a fragmentary detail section taken on line 5—5 of Fig. 2. Fig. 6 is a section taken on line 6—6 of Fig. 1, with parts shown in elevation. Fig. 7 is a fragmentary detail of the rear end of the truck, taken on line 7—7 of Fig. 2 with parts shown in elevation.

As shown in the drawings, the reference numerals 1 and 2, indicate the tubular side sills of a truck, which, at their rear ends, have fitted therewithin tubular handles 3. Long integral truss brackets 4, are connected beneath each of said side sills 1 and 2, respectively, and for this purpose said brackets have formed integral therewith tubular T elements 5, 6, and 7, respectively, through which said respective tubular side sills 1 and 2, extend. Transverse tubular cross piece members 8, 9, and 10, respectively, are mounted between said side sills 1 and 2, and engaged at their ends in the respective T elements 5, 6, and 7. Each of said cross pieces is arched downwardly at its middle, as clearly shown in Figs. 4 and 6. Near the rear end of the truck T elements 11, are engaged around said side sills 1 and 2, respectively, and secured therein is another cross piece 12, which, however, is straight, as clearly shown in Fig. 5. The shank of each of said T elements, as clearly shown in Figs. 4 and 5, in which said cross pieces are engaged, is offset downwardly or below the axial center of said tubular side sills, in order that objects placed upon the truck may not be unbalanced by contact with the heads of bolts 13, which serve to secure longitudinal straps or bars 14, upon said cross pieces. Each of said truss brackets 4, is provided with an inclined guideway 15, in which the axle 16, of the device, provided with wheels 17, may be moved in order to change the pivot point of the truck frame upon the axle when desired.

Locking levers 18, for maintaining the axle in any desired position are provided, having a plurality of notches adapted to engage over said axle to hold the same in position, said levers being pivoted at their forward ends to permit the same to be swung upwardly away from the guideways for adjustment of the axle. For the purpose of adjusting said locking levers the same are each provided with a slot 19, and a long crank bar 20, journaled at its ends in said truss brackets 4, is provided with depending cranks 21, the lower ends of which are provided with gudgeons engaging in said slots 19. Said crank bar 20, is actuatable by the foot of the operator against the tension of a spiral spring 22, one end of which is attached upon said crank bar. The other end of said tension spring 22, is connected upon a tie rod 23, which extends transversely of the truck and is secured at its ends in lug extensions of the T elements 5.

Supporting legs 24, are mounted at the rear end of each of the side sills 1 and 2, and each consists of a channel bar bent to the proper shape, as shown in Fig. 7, one end thereof secured against the under side of the side sill adjacent the T elements 5, and the other end secured beneath the side sill adjacent the T elements 11. A rigid connection is effected between the T elements, the side sill, and said supporting legs by means of bolts 25 and 26. The bolt 25, extends through one end of said leg member 24, through the sill, and through an integral extension of said T element 5, and the other bolt 26, extends through the other end of the leg, the sill, the T element 11, and also the tubular handle 3, which extends into said sill. Each of said leg members 24, is braced transversely of the truck, as clearly shown in Fig. 5, by means of a channel bar 27, the lower ends of which are secured on said legs 24, and at its middle said channel is bent upwardly and secured beneath the tubular cross piece 12, by means of the bolts 13, which also hold said strap bars 14, thereon. Said legs 24, are further braced by connection to the respective truss brackets 4, and for this purpose a tubular compression member 28, is fitted between the bracket 4, and leg 24, as shown in Fig. 7, with a tension rod 29, extending therethrough and through apertures provided in said bracket and leg respectively and adapted to be removably held in position by means of a nut threaded upon one end thereof.

A toe 30, is mounted at the front end of the truck, and for this purpose is provided with integral shaft or rod extensions 31, which extend into the ends of the respective tubular side sills 1 and 2. An exceedingly rigid connection is effected between said toe member, the sills and the T elements 7, by means of bolts 32, extending through the same. Said toe member at each of its ends is also provided with integral downwardly directed extensions 33, which bear upon forwardly extending integral lugs 34, on said truss brackets 4, thus greatly reinforcing the toe member, especially when the same is used in prying up heavy objects prior to placing the same upon the truck. Said toe 30, is also provided with rearwardly directed intermediate straps or bars 35, integral therewith, which extend beneath the cross piece 10, and are secured thereto by means of the bolts 13, which also serve to hold the top bars 14, thereon.

A bracket member 36, is pivoted in position on the channel brace member 27, and has connected thereto a chain 37, and hook 38, by which objects may be engaged to hold the same in position upon the truck.

Inasmuch as this invention relates only to the particular structure of the truck itself, and not to the axle shifting mechanism or load gripping means, the details thereof have not been entered into other than to briefly illustrate the operation. However, the manner of assembly of the parts of the truck structure whereby in many instances a single bolt is utilized to connect a number of members together, and the association of the frame members with reinforcing truss brackets and brace legs, affords a device exceedingly durable and capable of withstanding great shock, and as well carrying heavy loads.

I am aware that various details of construction may be varied through a wide range without departing from the principles of this invention, and I therefore do not purpose limiting the patent granted otherwise than necessitated by the prior art.

I claim as my invention:

1. In a device of the class described tubular sill members, handles inserted therein, T-elements engaged on said sill members, cross pieces engaged in said T-elements, a truss bracket integral with certain of said T-elements extending longitudinally of the sill members, and interfitting means for reinforcing the same.

2. In a device of the class described tubular side sills, handles inserted in the rear ends thereof, a toe member extending across at the front end of said sills, integral rods on said toe member extending within said tubular side sills, truss brackets, one for each of said side sills, tubular T-elements integral therewith through which said side sill members are engaged, tubular cross piece members extending between said sill members with their ends inserted in said T-elements, and bolts extending through certain of said T-elements and sill members and said respective handle and toe members to hold all of said parts rigidly connected.

3. In a hand truck of the class described tubular side sill members, handles inserted therein at the ends thereof, a toe member, projections thereon inserted into the other ends of said side sill members, truss brackets, one disposed beneath each of said side sill members, lugs integrally formed thereon adapted to engage said toe member to reinforce the same, a plurality of tubular T-elements integral with each of said truss brackets through which said side sill members extend, wheels journaled on said truss brackets, and supporting legs connected at the rear of said truck to the sill members thereof.

4. In a truck of the class described a frame comprising side sill members, T-elements through which said side sill members extend, tubular cross pieces, the ends thereof inserted and secured in said T-elements, handles inserted into said side sill members at the rear end of the truck, a toe at the forward end of said truck, integral rod extensions on said toe inserted into said sill members, a truss bracket integral with certain of said T-elements and disposed beneath each of said tubular side sill members, legs connected to said side sill members at the rear of the truck, and interfitting brace members connected between said legs and said truss brackets.

5. In a truck of the class described tubular side sill members, tubular cross pieces connected thereto, truss brackets rigidly connected to each of said tubular side sills, wheels journaled on said brackets, legs at the rear of the truck, and interfitting compression and tension brace members between said truss brackets and said legs.

6. In a hand truck of the class described tubular side sills, a toe at the forward end thereof, integral extensions on said toe insertible into said tubular side sill members, truss brackets beneath each of said side sills, integral tubular T-elements on said brackets through which said side sill members extend, bolts at the forward end of the truck extending through certain of said T-elements, said side sills and the integral extension on said toe members, handles inserted into the other end of said tubular side sill members, tubular T-elements engaged over said latter ends of said tubular side sill elements, bolts extending through said T-elements, said side sills and said handles to hold the same rigidly connected, legs at the rear of the truck attached to said side sill members by means of said bolts, wheels journaled on said truss brackets, a rigid connection between said legs and said truss brackets, and tubular cross pieces extending between the side sills and engaged at their ends in said T-elements.

7. In a truck of the class described side members, truss brackets rigidly connected to each thereof, lugs integrally formed on said brackets, a toe at the forward end of said truck, integral rod extensions on said toe adapted for insertion into said side members, and downwardly directed extensions integrally formed on said toe adapted to bear upon said lugs to reinforce said toe.

In testimony whereof I have hereunto subscribed my name in the presence of two subscribing witnesses.

FRANK ELLSWORTH KNAPP.

Witnesses:
CHARLES W. HILLS, Jr.,
FRANK K. HUDSON.

Copies of this patent may be obtained for five cents each, by addressing the "Commissioner of Patents, Washington, D. C."